United States Patent
Guedalia et al.

(10) Patent No.: US 9,843,886 B2
(45) Date of Patent: Dec. 12, 2017

(54) USER INTERACTIVE APPLICATION ENABLED GATEWAY

(71) Applicant: QUALCOMM Incorporated, San Diego, CA (US)

(72) Inventors: Isaac David Guedalia, Beit Shemesh (IL); Ravinder Paul Chandhok, Del Mar, CA (US); Jacob Guedalia, New York, NY (US); Clifton Eugene Scott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 14/472,083

(22) Filed: Aug. 28, 2014

(65) Prior Publication Data

US 2015/0081904 A1     Mar. 19, 2015

Related U.S. Application Data

(60) Provisional application No. 61/878,522, filed on Sep. 16, 2013.

(51) Int. Cl.
    *G06F 15/173*     (2006.01)
    *G06F 15/16*     (2006.01)
    (Continued)

(52) U.S. Cl.
    CPC ............ *H04W 4/005* (2013.01); *H04L 41/28* (2013.01); *H04L 47/20* (2013.01); *H04L 67/12* (2013.01);
    (Continued)

(58) Field of Classification Search
    CPC ..... H04L 47/14; H04L 47/20; H04L 65/1059; H04L 67/18; H04L 67/12
    (Continued)

(56) References Cited

U.S. PATENT DOCUMENTS

| | | |
|---|---|---|
| 8,230,466 B2 | 7/2012 | Cockrell et al. |
| 8,352,546 B1 | 1/2013 | Dollard |
| | (Continued) | |

FOREIGN PATENT DOCUMENTS

| | | |
|---|---|---|
| EP | 1284069 B1 | 11/2004 |
| EP | 1708446 A1 | 10/2006 |
| | (Continued) | |

OTHER PUBLICATIONS

Interdigital, "Standardized Machine-to-Machine (M2M) Software Development Platform," White Paper, Oct. 2012, pp. 1-20.
(Continued)

*Primary Examiner* — Kristie Shingles
(74) *Attorney, Agent, or Firm* — Muncy, Geissler, Olds & Lowe, P.C.

(57) ABSTRACT

The disclosure is related to providing interconnectivity between a plurality of user devices. A wireless interconnectivity device connects to a first user device of the plurality of user devices over a first local wireless network, connects to a second user device of the plurality of user devices over a second local wireless network, receives a request from the first user device to transfer data from the first user device to the second user device, determines whether or not a third user device has granted permission to transfer the data from the first user device to the second user device, and transfers the data from the first user device to the second user device based on the third user device having granted permission to transfer the data from the first user device to the second user device.

30 Claims, 17 Drawing Sheets

(51) Int. Cl.
*H04W 4/00* (2009.01)
*H04L 12/24* (2006.01)
*H04L 29/08* (2006.01)
*H04L 12/813* (2013.01)
*H04W 12/08* (2009.01)
*H04L 12/28* (2006.01)
*H04L 12/801* (2013.01)
*H04L 29/06* (2006.01)

(52) U.S. Cl.
CPC ............ *H04W 4/008* (2013.01); *H04W 12/08* (2013.01); *H04L 47/14* (2013.01); *H04L 69/08* (2013.01); *H04L 2012/2841* (2013.01)

(58) Field of Classification Search
USPC ........................................................ 709/225
See application file for complete search history.

(56) References Cited

U.S. PATENT DOCUMENTS

| | | | |
|---|---|---|---|
| 2004/0044776 A1 | 3/2004 | Larkin | |
| 2004/0198319 A1 | 10/2004 | Whelan et al. | |
| 2005/0070326 A1* | 3/2005 | Morton | H04W 92/02 455/552.1 |
| 2010/0228767 A1 | 9/2010 | Slinker et al. | |
| 2012/0079092 A1 | 3/2012 | Woxblom et al. | |
| 2012/0136957 A1 | 5/2012 | Bellamy, III et al. | |
| 2013/0090139 A1 | 4/2013 | McHenry et al. | |
| 2013/0195091 A1 | 8/2013 | Gibbs et al. | |
| 2013/0222133 A1 | 8/2013 | Schultz et al. | |
| 2013/0246584 A1* | 9/2013 | Barton | H04L 67/325 709/219 |
| 2013/0263217 A1* | 10/2013 | Avital | G06F 21/31 726/3 |
| 2014/0082702 A1 | 3/2014 | Supalla | |
| 2014/0244001 A1 | 8/2014 | Glickfield et al. | |
| 2014/0244568 A1 | 8/2014 | Goel et al. | |
| 2015/0134761 A1 | 5/2015 | Sharma et al. | |

FOREIGN PATENT DOCUMENTS

| | | |
|---|---|---|
| EP | 2045970 A1 | 4/2009 |
| EP | 2574026 A1 | 3/2013 |
| WO | 2007098468 A1 | 8/2007 |
| WO | 2007125421 A2 | 11/2007 |
| WO | 2012166671 A1 | 12/2012 |
| WO | 2013086363 A2 | 6/2013 |
| WO | 2013123445 A1 | 8/2013 |

OTHER PUBLICATIONS

Blazevic L., et al., "A Location-Based Routing Method for Mobile Ad Hoc Networks", IEEE Transactions on Mobile Computing, IEEE, vol. 4, No. 2, 2004, pp. 97-110.

Brodkin J., "Open source will let your fridge send messages to your TV and phone," Dec. 10, 2013, [Retrieved dated on Sep. 22, 2014], Retrieved from the Internet < URL: http://arstechnica.com/information-technology/2013/12/open-source-will-let-your-fridge-send-messages-to-your-tv-and-phone/ >, 4 Pages.

Guo B., et al., "From the internet of things to embedded intelligence," 2012, pp. 1-29.

International Search Report and Written Opinion—PCT/US2014/053547—ISA/EPO—dated Nov. 26, 2014.

Shah S. H., et al., "Predictive Location-Based QoS Routing in Mobile Ad Hoc Networks", IEEE International Conference on Communications, IEEE, vol. 2, 2002, pp. 1022-1027.

* cited by examiner

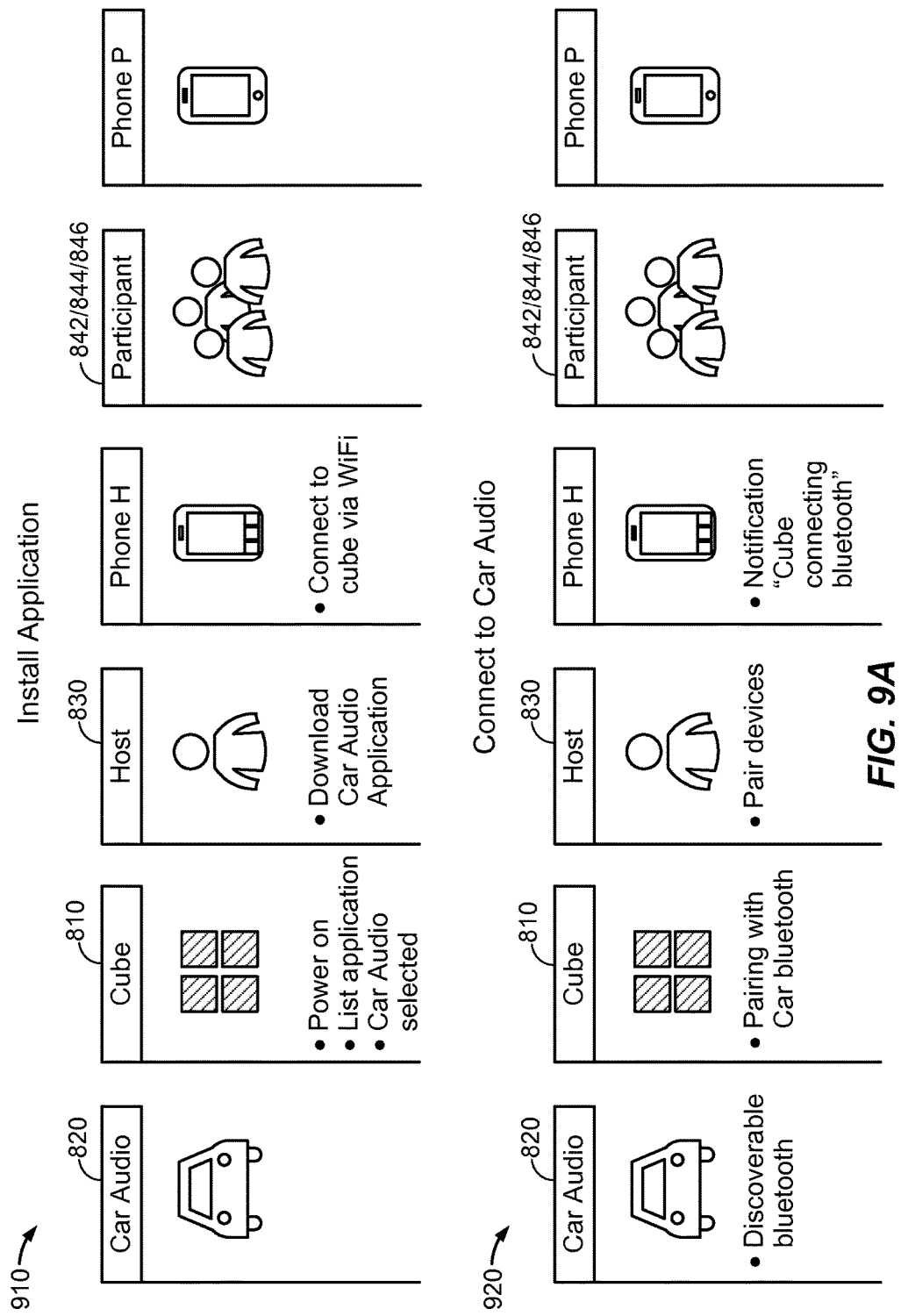

USER INTERACTIVE APPLICATION ENABLED GATEWAY

CROSS-REFERENCE TO RELATED APPLICATIONS

The present application for patent claims the benefit of U.S. Provisional Application No. 61/878,522, entitled "A USER INTERACTIVE APPLICATION ENABLED GATEWAY," filed Sep. 16, 2013, assigned to the assignee hereof, and expressly incorporated herein by reference in its entirety.

FIELD OF THE DISCLOSURE

The disclosure is related to a user interactive application enabled gateway.

DESCRIPTION OF THE RELATED ART

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein for a user interactive application enabled gateway in a simplified form to precede the detailed description presented below.

The disclosure is related to providing interconnectivity between a plurality of user devices performed by a wireless interconnectivity device. A method of providing interconnectivity between a plurality of user devices performed by a wireless interconnectivity device includes connecting to a first user device of the plurality of user devices over a first local wireless network, connecting to a second user device of the plurality of user devices over a second local wireless network, receiving a request from the first user device to transfer data from the first user device to the second user device, determining whether or not a third user device has granted permission to transfer the data from the first user device to the second user device, and transferring the data from the first user device to the second user device based on the third user device having granted permission to transfer the data from the first user device to the second user device.

A wireless interconnectivity device for providing interconnectivity between a plurality of user devices includes a first transceiver configured to connect to a first user device of the plurality of user devices over a first local wireless network, a second transceiver configured to connect to a second user device of the plurality of user devices over a second local wireless network, wherein the first transceiver is further configured to receive a request from the first user device to transfer data from the first user device to the second user device, and a processor configured to determine whether or not a third user device has granted permission to transfer the data from the first user device to the second user device, wherein the second transceiver is further configured to transfer the data from the first user device to the second user device based on the third user device having granted permission to transfer the data from the first user device to the second user device.

An apparatus for providing interconnectivity between a plurality of user devices includes logic configured to connect to a first user device of the plurality of user devices over a first local wireless network, logic configured to connect to a second user device of the plurality of user devices over a second local wireless network, logic configured to receive a request from the first user device to transfer data from the first user device to the second user device, logic configured to determine whether or not a third user device has granted permission to transfer the data from the first user device to the second user device, and logic configured to transfer the data from the first user device to the second user device based on the third user device having granted permission to transfer the data from the first user device to the second user device.

An apparatus for providing interconnectivity between a plurality of user devices includes means for connecting to a first user device of the plurality of user devices over a first local wireless network, means for connecting to a second user device of the plurality of user devices over a second local wireless network, means for receiving a request from the first user device to transfer data from the first user device to the second user device, means for determining whether or not a third user device has granted permission to transfer the data from the first user device to the second user device, and means for transferring the data from the first user device to the second user device based on the third user device having granted permission to transfer the data from the first user device to the second user device.

A non-transitory computer-readable medium for providing interconnectivity between a plurality of user devices includes at least one instruction to cause a wireless interconnectivity device to connect to a first user device of the plurality of user devices over a first local wireless network, at least one instruction to cause a wireless interconnectivity device to connect to a second user device of the plurality of user devices over a second local wireless network, at least one instruction to cause a wireless interconnectivity device to receive a request from the first user device to transfer data from the first user device to the second user device, at least one instruction to cause a wireless interconnectivity device to determine whether or not a third user device has granted permission to transfer the data from the first user device to the second user device, and at least one instruction to cause a wireless interconnectivity device to transfer the data from the first user device to the second user device based on the third user device having granted permission to transfer the data from the first user device to the second user device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

FIGS. 9A and 9B illustrate an exemplary flow for using the Cube illustrated in FIG. 8 to share a playlist with the vehicle audio system illustrated in FIG. 8.

DETAILED DESCRIPTION

Figure 1A:
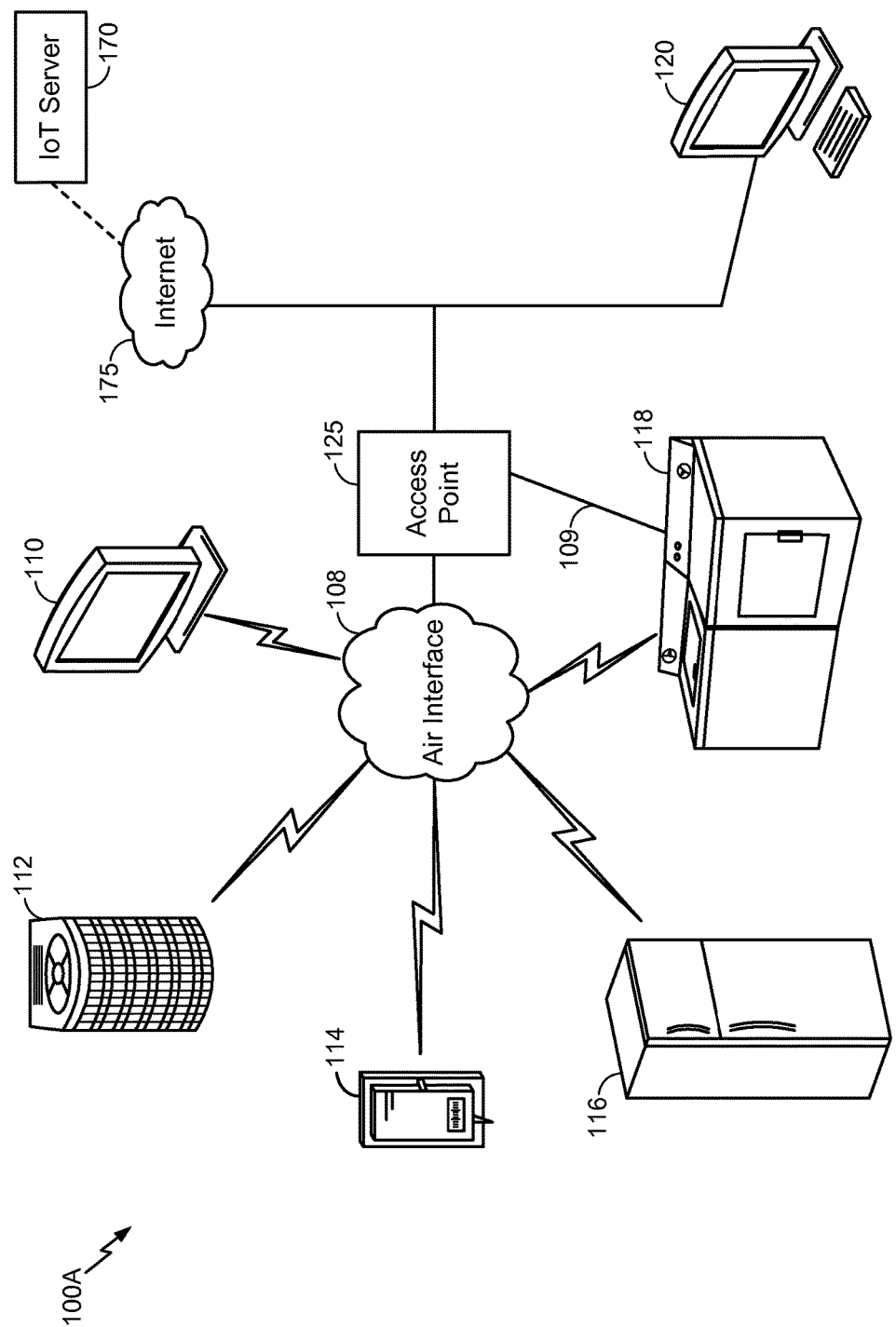
FIG. 1A illustrates a high-level system architecture of a wireless communications system in accordance with an aspect of the disclosure.

Various aspects are disclosed in the following description and related drawings to show specific examples relating to exemplary embodiments for a user interactive application enabled gateway. In an aspect, a wireless interconnectivity device can provide interconnectivity between a plurality of user devices. The interconnectivity device may connect to a first user device of the plurality of user devices over a first local wireless network, connect to a second user device of the plurality of user devices over a second local wireless network, receive a request from the first user device to transfer data from the first user device to the second user device, determine whether or not a third user device has granted permission to transfer the data from the first user device to the second user device, and transfer the data from the first user device to the second user device based on the third user device having granted permission to transfer the data from the first user device to the second user device.

Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, a smartphone, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones (including smartphones), desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
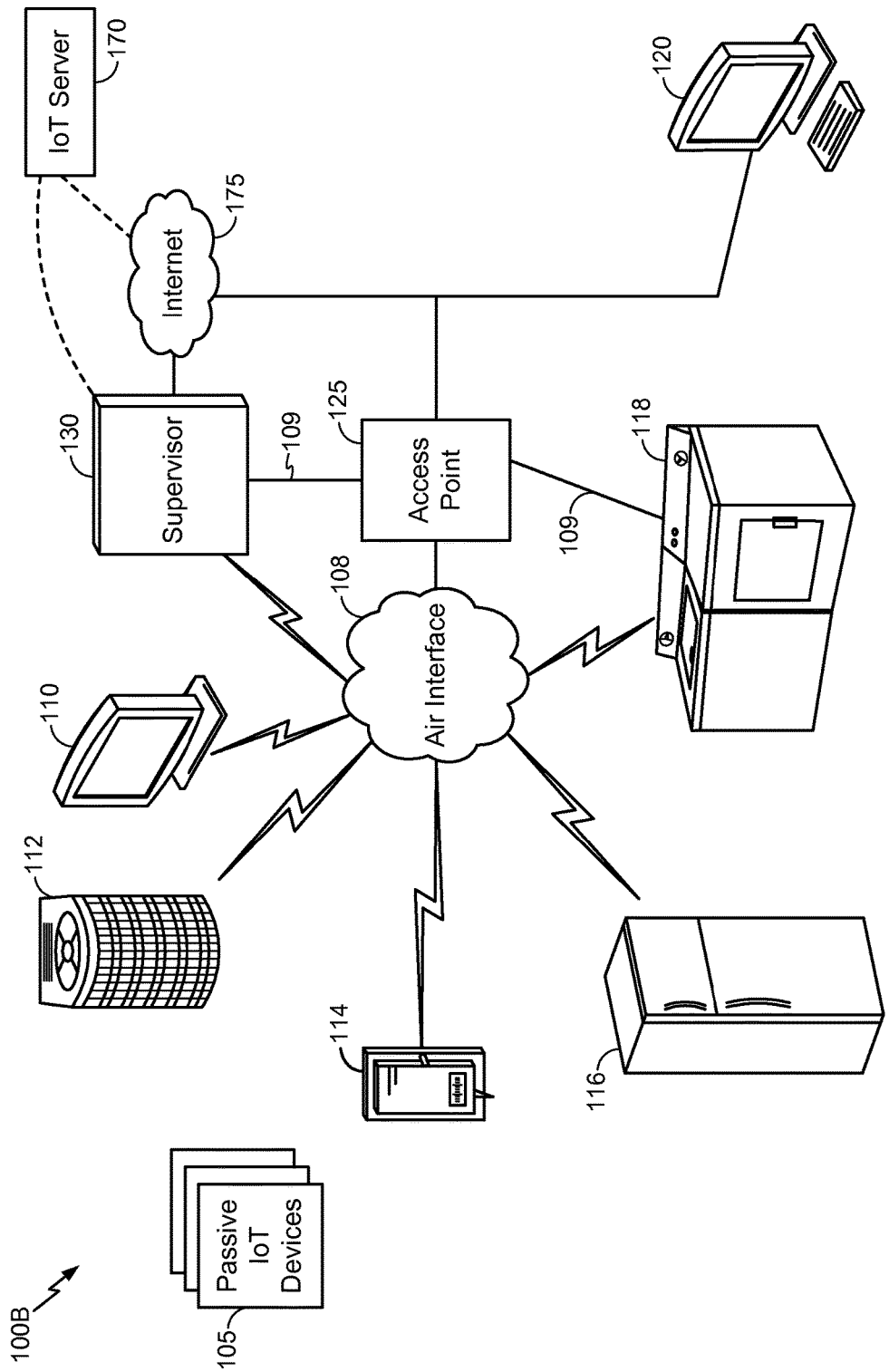
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
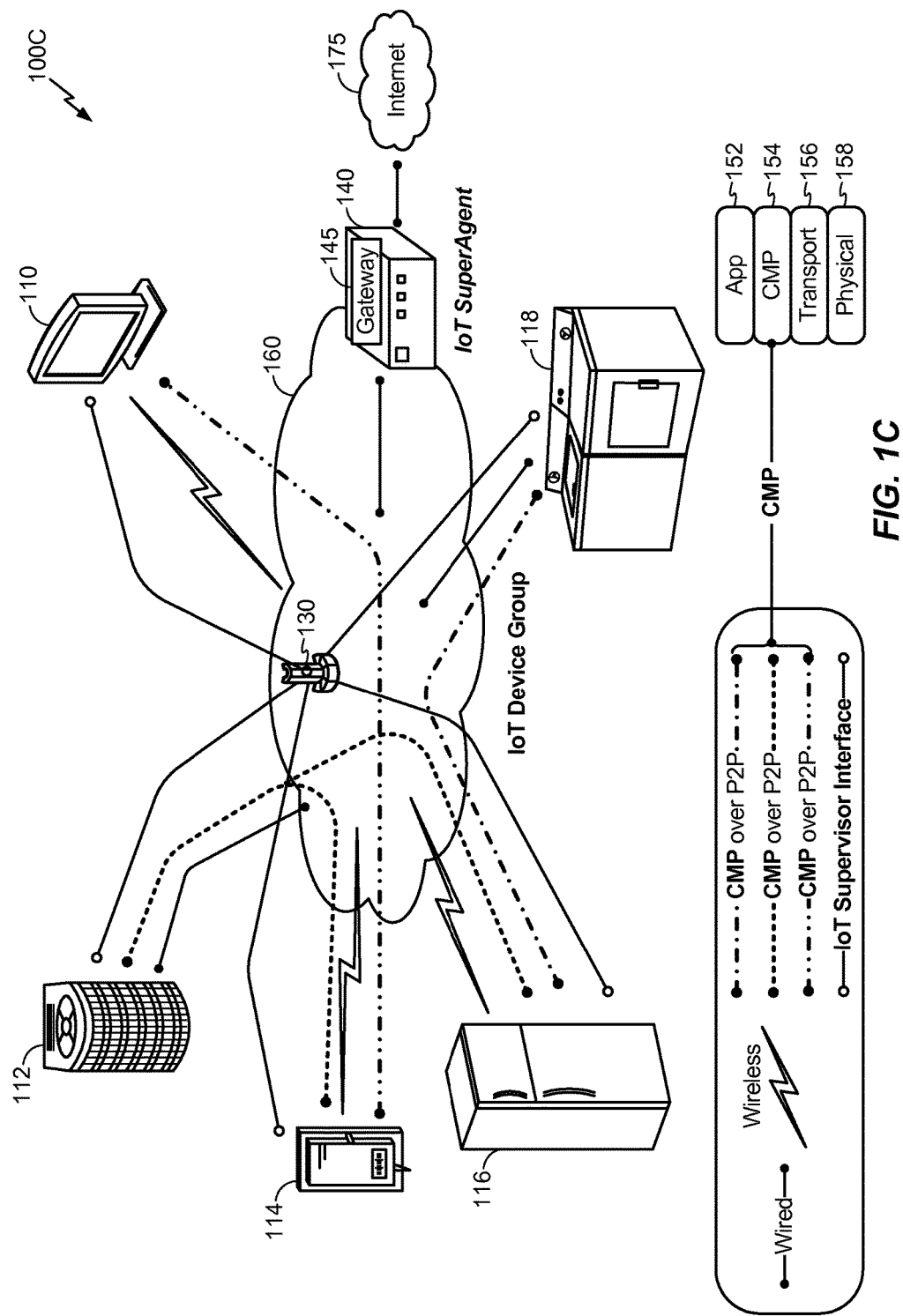
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
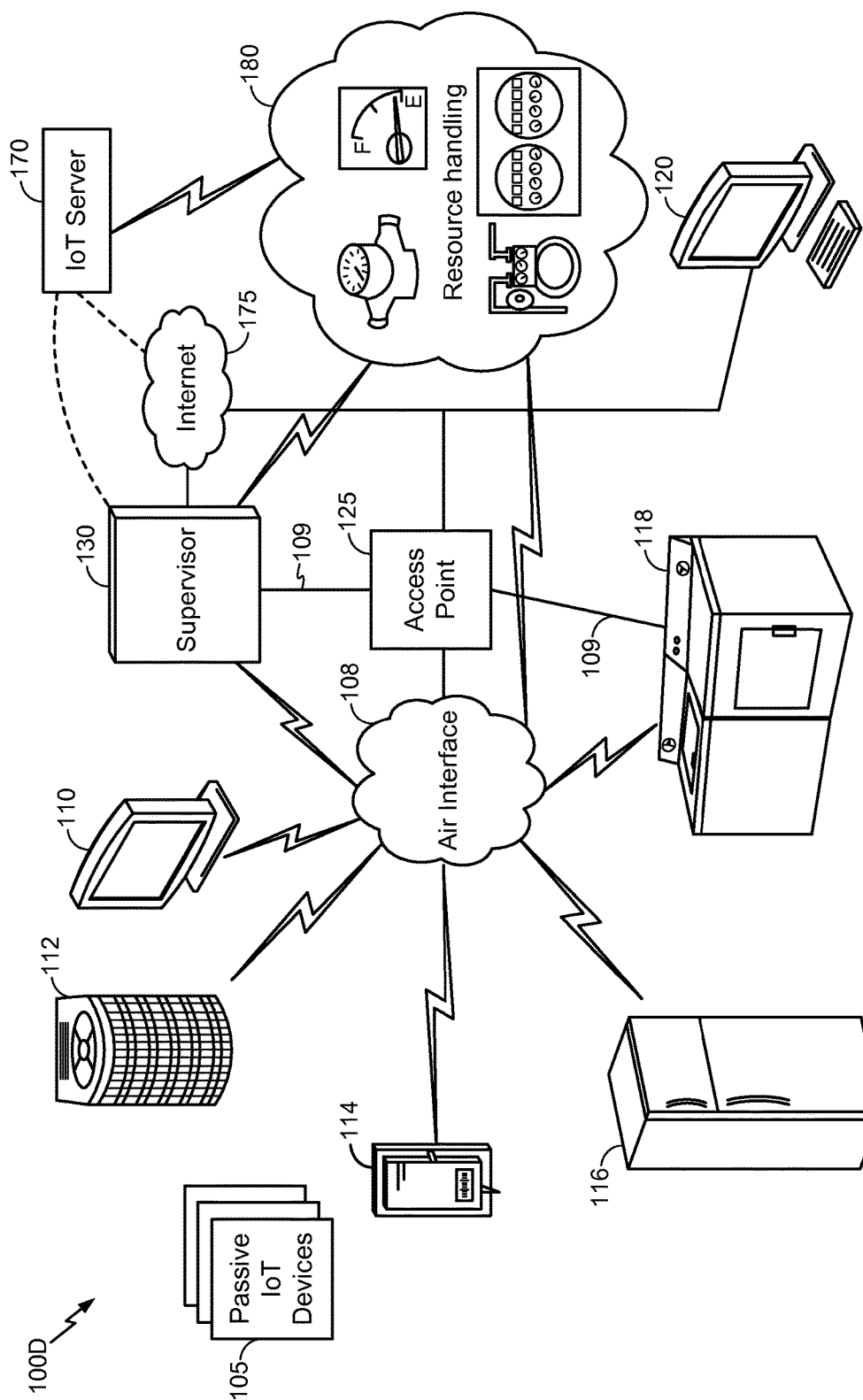
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
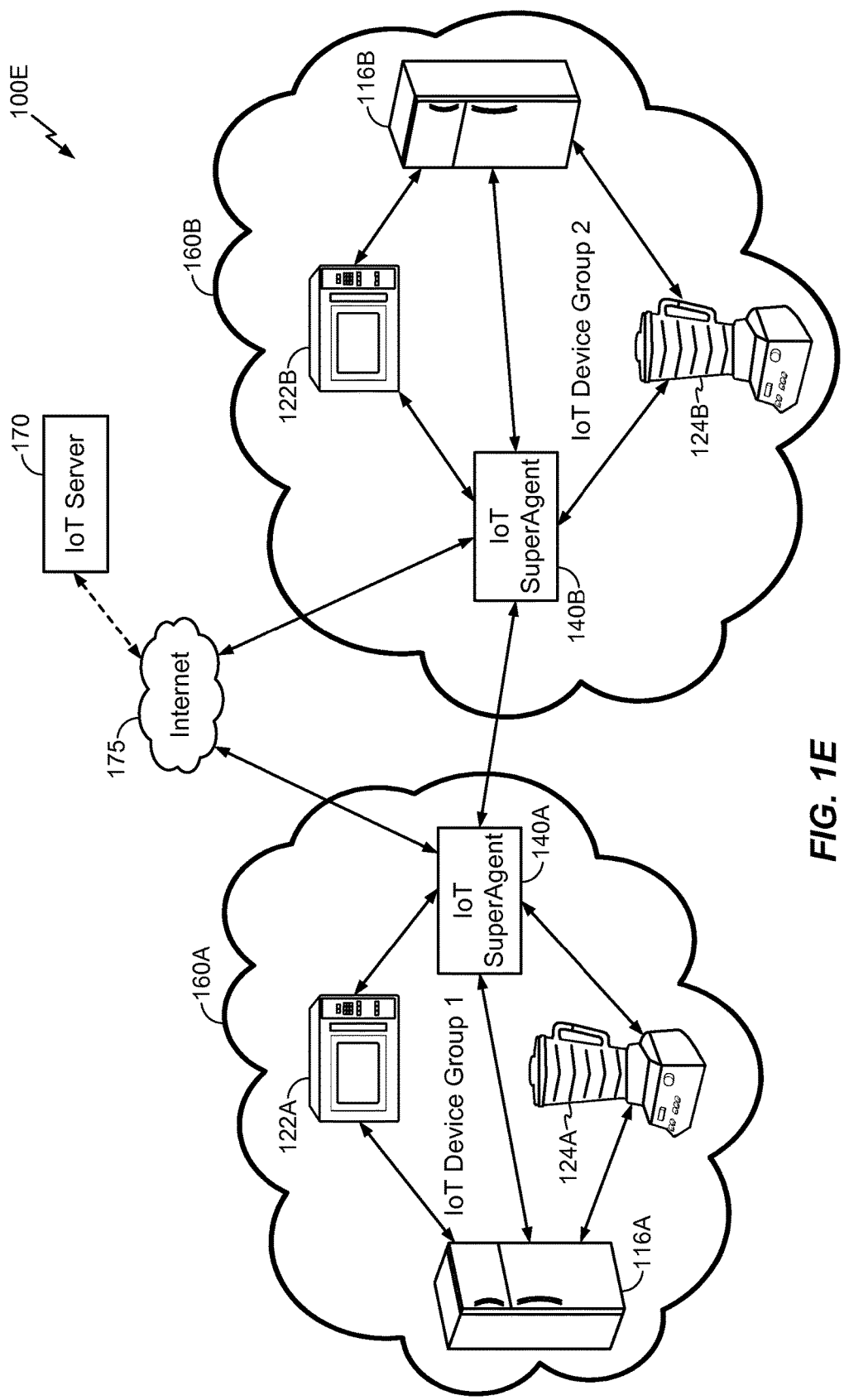
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
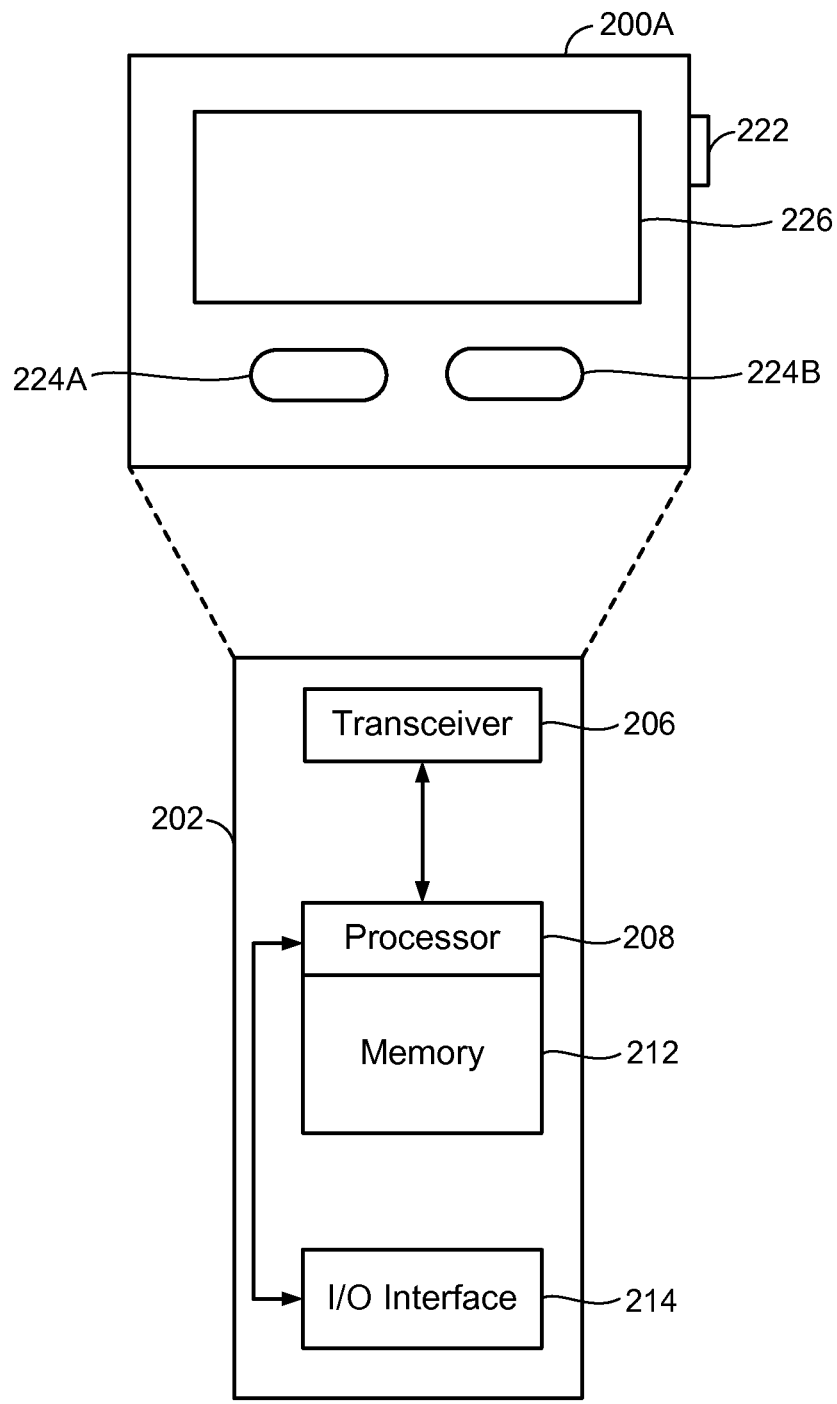

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Figure 2B:
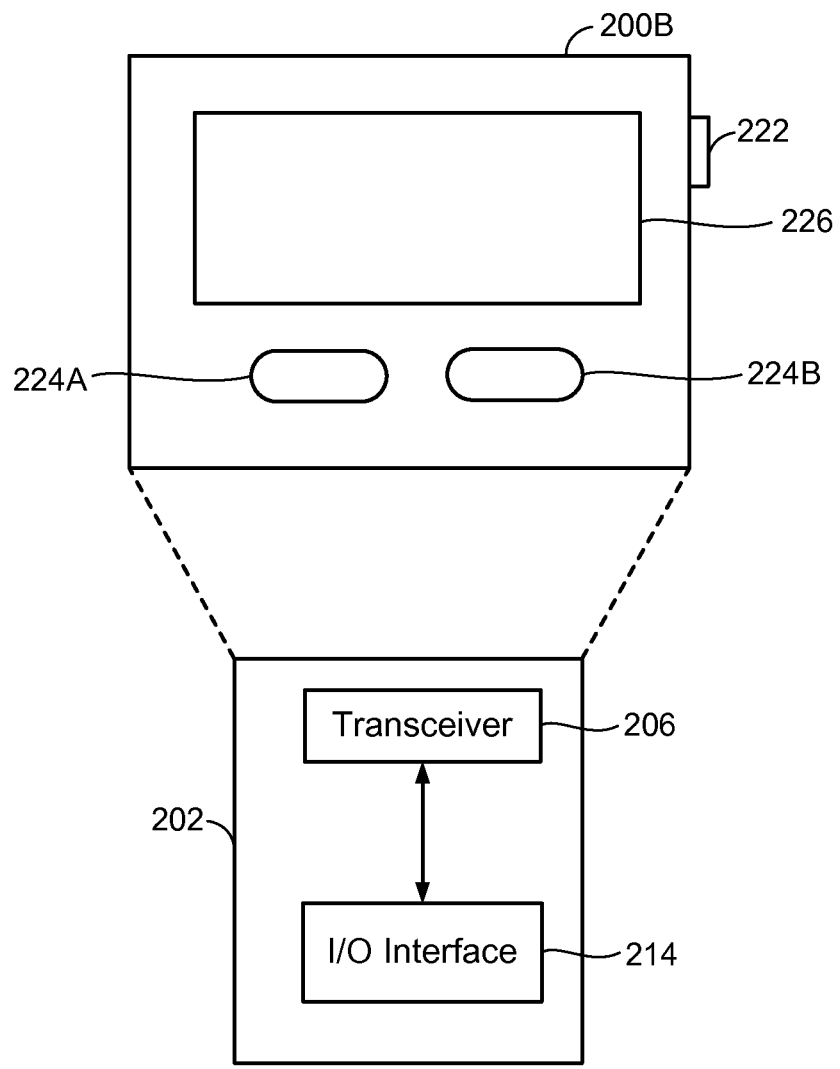
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
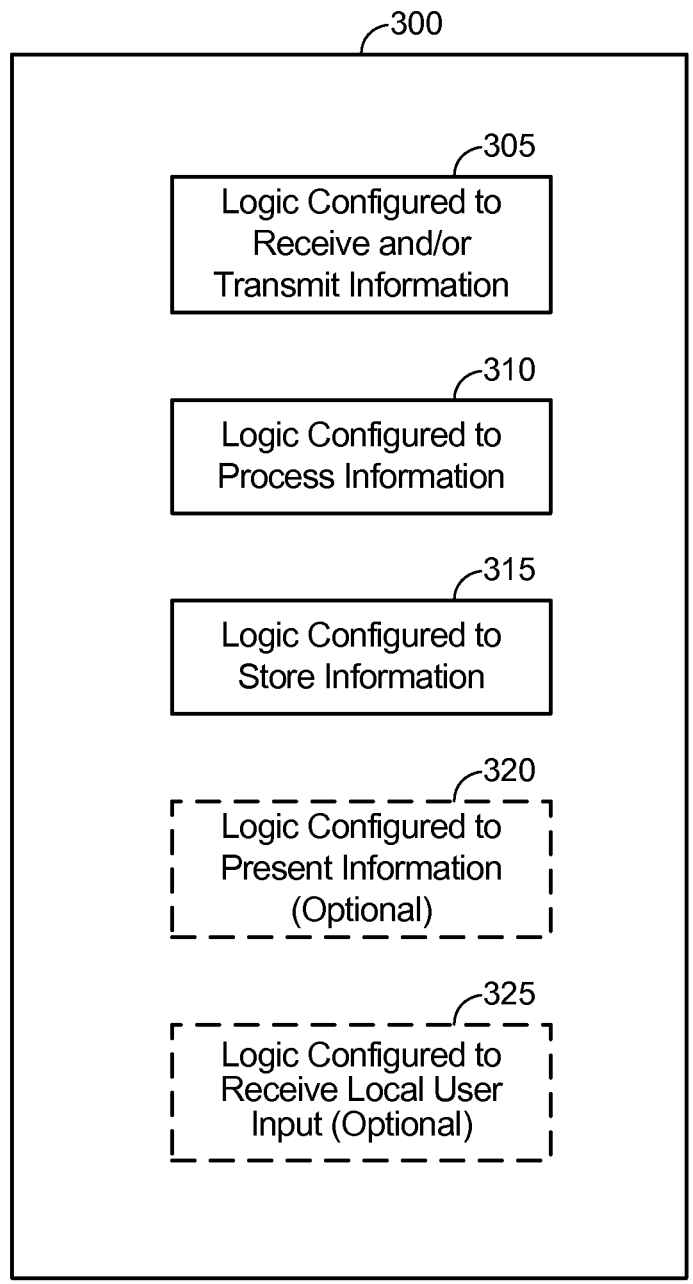
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
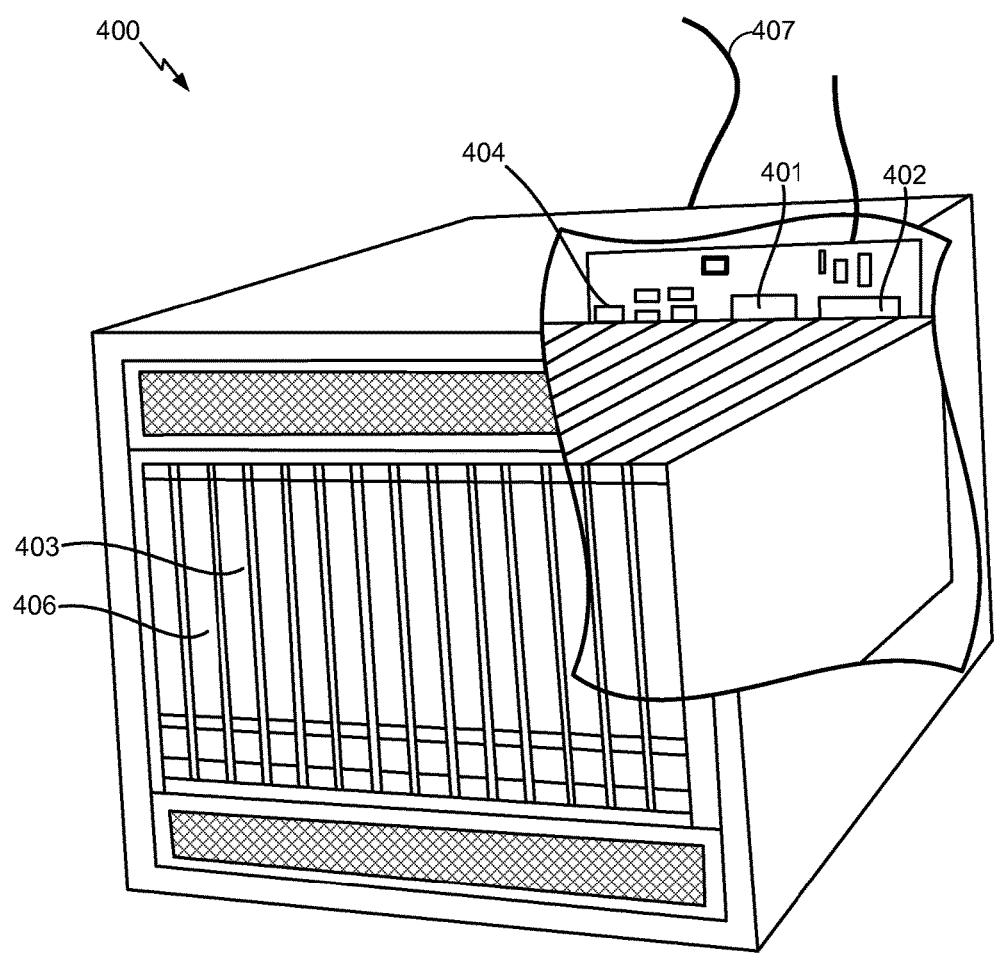
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
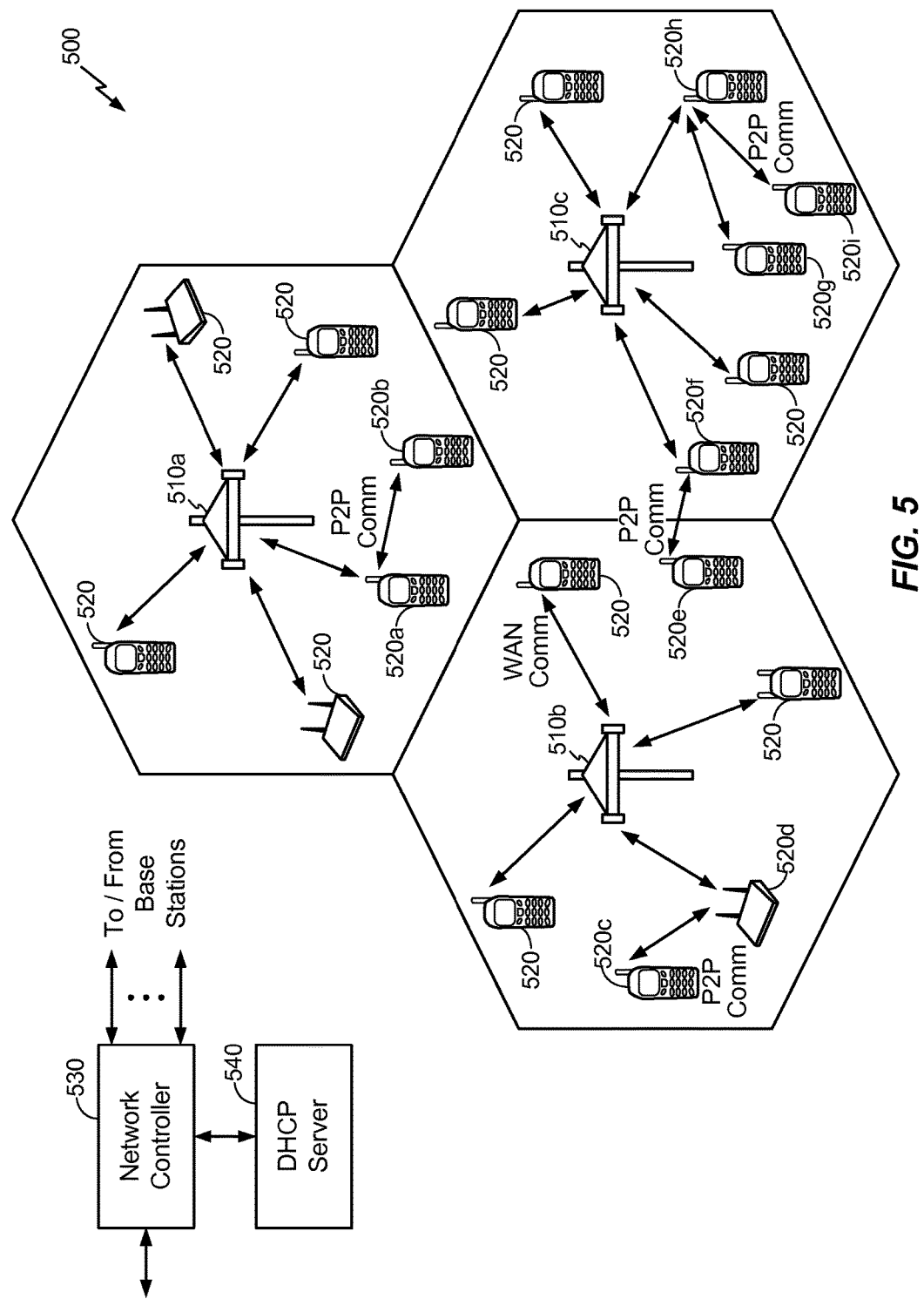
FIG. 5 illustrates a wireless communication network that may support discoverable peer-to-peer (P2P) services, in accordance with one aspect of the disclosure.

In general, user equipments (UEs), such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
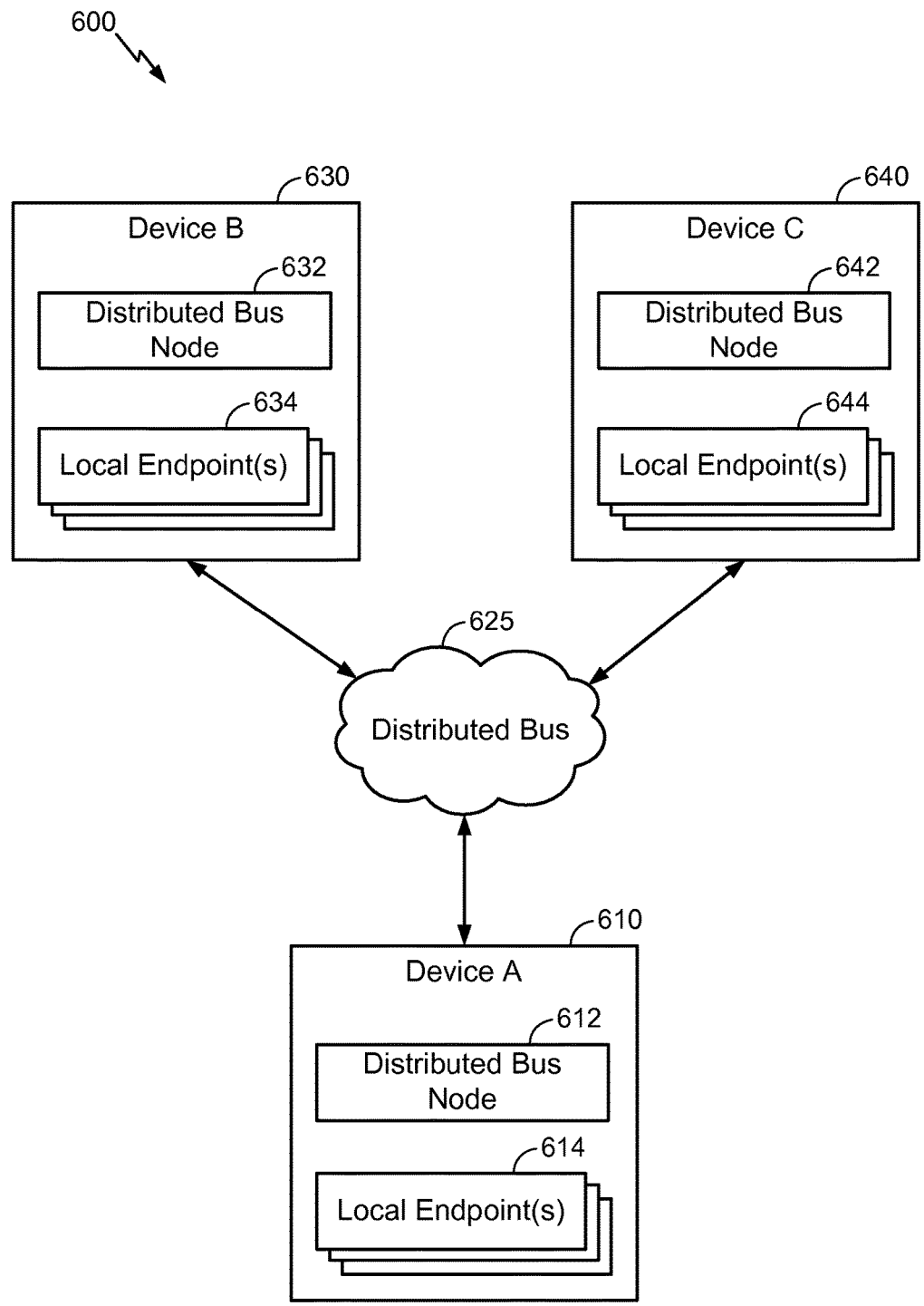
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
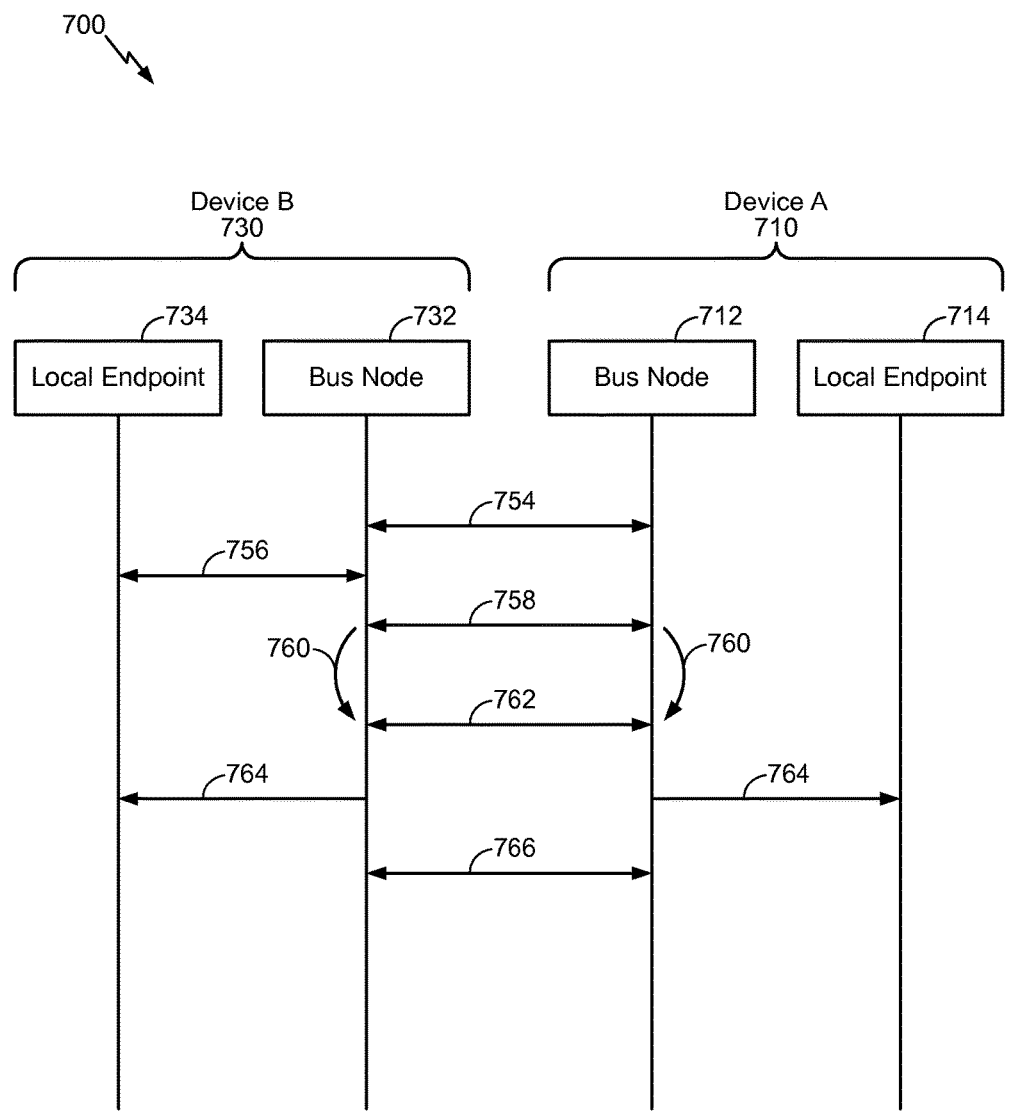
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

The IoT is an important industry trend. However, existing and nascent IoT solutions are not unified and do not share a common interface or protocol. There are a plethora of IoT devices and formats that may need to interconnect. For example, a user may wish to connect a car radio with a smartphone and an audio player. Beyond the basic need to cross communicate, there is an additional missing link. It is not enough to just transfer the information between devices—there is also a need to incorporate application logic and user input.

Accordingly, the disclosure provides a wireless interconnectivity device, or "Cube," that provides a user interactive application enabled gateway. The Cube may support a number of IoT services, such as proximity services, notifications, ad hoc networking, audio streaming, Advanced Audio Distribution Profile (A2DP) pipe services, text-to-speech (TTS) services, control services, and/or authentication services. The Cube can provide gateway functionality, but is not a mere translator, but rather an application translator, enabling user input to guide the translation functionality. The Cube can provide a bridge interface between IoT networks and devices from different manufacturers and/or running different operating systems. The Cube can create an ad hoc local wireless network to enable disparate IoT devices to communicate with each other. The local wireless network may be, for example, a WiFi network, a WiFi Direct network, an LTE Direct network, a Bluetooth network, etc.

When a user adds an IoT device to his/her personal network, or powers on an IoT device, that device can register with the Cube. To register, the new IoT device may first discover the Cube and/or the Cube may discover the new IoT device using a proximity service. In this disclosure, IoT devices are considered "proximate" to each other if they are in the same room or vehicle with each other, and this can be authenticated. A device may identify proximate devices by broadcasting a particular sound and listening for a particular response. The device may also listen for a particular broadcast sound and provide a particular response to the broadcasting device. Proximity may also, or alternatively, be defined to include a device's proximity to the Cube and to other devices that are connected to the same Cube for the same service(s) and application(s). In this way, where various devices and users are participating, a device is proximal if it is near the Cube and the other participants.

Once the IoT device and the Cube discover each other, the new IoT device can connect to the Cube. The Cube may act as a local wireless network access point, such as a WiFi access point, in order to communicate with other IoT devices. Once connected, the IoT device can register with the Cube, which can include providing the Cube with its capability information. The Cube can store the capability information of all IoT devices on the user's IoT network.

At some point, the user may wish to perform some task with, or retrieve some information from, the user's IoT network. The user can access the Cube, which can display the various tasks the IoT network can perform, or the various information the IoT network can provide. For example, the IoT network may include a clock with an integrated thermometer (a first IoT device in the IoT network) and a video camera that can also detect the ambient temperature (a second IoT device in the IoT network). In that case, the Cube could display icons indicating that the user can take a video or discover the current indoor temperature. If the user selects the temperature icon, for example, the cube can communicate with either the clock of the video camera to retrieve the current temperature. The user need not know from which device the Cube will retrieve this information. The Cube can then display the retrieved temperature to the user. Alternatively, at the request of the user, for example, the Cube can send the retrieved temperature to another IoT device, such as the user's smartphone.

The Cube may also provide other functionality. The following description provides an example of using the Cube to share a playlist in a vehicle. Many vehicles have various connectivity options to the audio system, such as an audio jack and/or Bluetooth. Currently, these vehicle audio systems only support a single device. However, there may be a number of people in a vehicle, each with a smartphone or media player and a playlist of songs that they wish to play over the vehicle's audio system.

Figure 8:
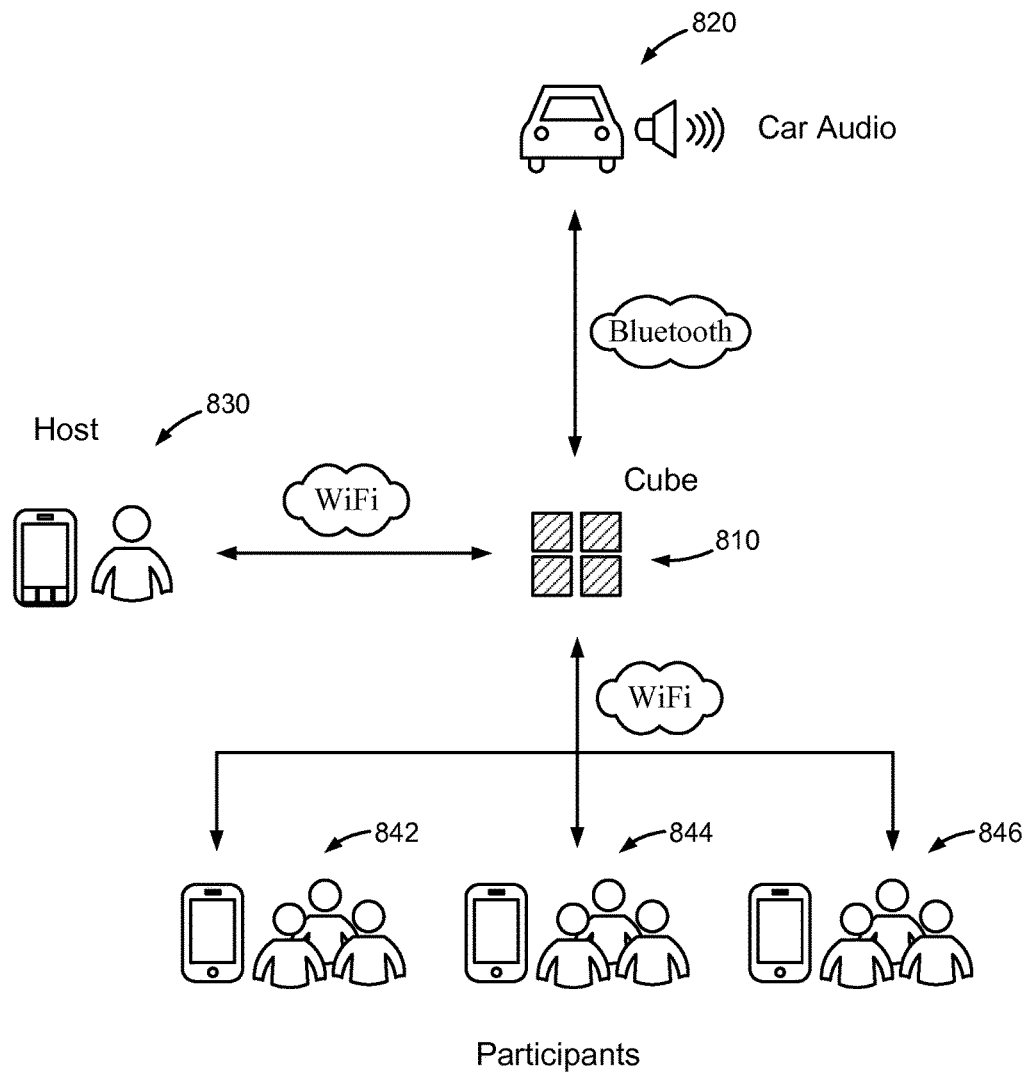
FIG. 8 illustrates an exemplary system configuration for using a Cube to share a playlist with a vehicle audio system.

FIG. 8 illustrates an exemplary system configuration for using a Cube 810 to share a playlist with a vehicle audio system 820. A host 830 may be connected to the Cube 810 over WiFi, for example. The Cube 810 may be connected to the vehicle audio system 820 over Bluetooth, for example. The participants 842, 844, and 846 may be connected to the Cube 810 over WiFi, for example. The host 830 may be a user with access to the Cube 810, such as the owner or operator of the Cube 810. The host 830 need not be, but may be, the owner and/or operator of the vehicle audio system 820.

Figure 9B:
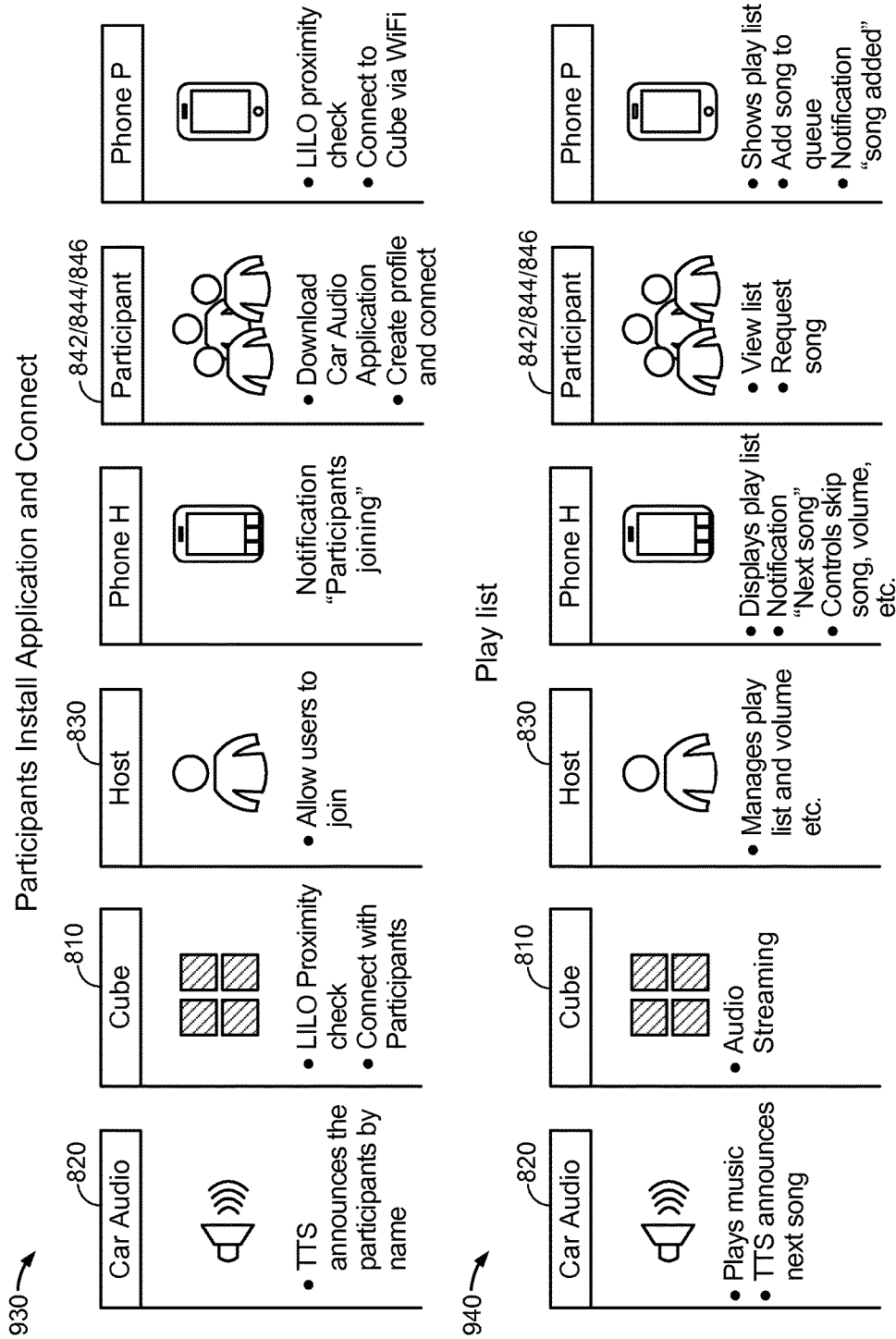

FIGS. 9A and 9B illustrate an exemplary flow for using the Cube 810 to share a playlist with the vehicle audio system 820. Referring to FIG. 9A, at 910, the Cube 810 launches an application to communicate with the vehicle audio system 820. If the application has not been previously downloaded and installed on the Cube 810, the host 830 can power on the Cube 810, if not already powered on, then download and install the application. If the application is already installed on the Cube 810, the host 830 can select the vehicle audio system application by, for example, scrolling through a list of available applications on the Cube 810. The host 830 then connects his/her UE to the Cube 810 using a local wireless network established by the Cube 810. In the example of FIGS. 8, 9A, and 9B, the local wireless network is a WiFi network.

At 920, the Cube 810 can connect to the vehicle audio system 820. The vehicle audio system 820 may have a discoverable local wireless network. In the example of FIGS. 8, 9A, and 9B, the local wireless network is a Bluetooth network. The host 810 can pair the Cube 810 with the vehicle audio system 820's local wireless network. During the pairing, the Cube 810 may display a notification that it is connecting to the vehicle audio system 820's local wireless network.

Referring to FIG. 9B, at 930, the participants 842, 844, and 846 can launch the vehicle audio system application on their UEs and connect to the Cube 810. The participants 842, 844, and 846 can download and install the vehicle audio system application if they have not already done so. The Cube 810 and the UEs of the participants 842, 844, and 846 can perform a proximity check, such as a Listen Location (LILO) proximity check, to determine that they are proximate each other. LILO is a mechanism by which a sound is emitted by one device and detected by one or more other devices.

After discovering each other, the UEs of the participants 842, 844, and 846 can connect to the Cube 810 via the local wireless network that the Cube 810 established in 910. The UEs of the participants 842, 844, and 846 may connect to the Cube 810 using a P2P protocol, such as the P2P protocol described above with reference to FIGS. 5-7. The host 830 may individually authorize the participants 842, 844, and 846 to connect to the Cube 810's local wireless network via, for example, the user interface of the Cube 810, or may grant permission to all participants trying to connect. The host 830's UE may display a notification when and/or of which participants 842, 844, and 846 are joining, and, if available, the vehicle audio system 820's text-to-speech (TTS) system may announce the joining participants 842, 844, and 846 by name. Once connected, the participants 842, 844, and 846 can create a profile on the Cube 810.

At 940, the host 830 and the participants 842, 844, and 846 can share their respective playlists. The Cube 810 can create a global playlist to which the participants 842, 844, and 846 and the host 830 can add songs. The UEs of the participants 842, 844, and 846 and the host 830 can display the global playlist, add songs to a queue of requested songs, and see notifications that the song has been added to the global playlist. The host 830, via his/her UE, can manage the global playlist, such as controlling which songs in the queue of requested songs are added to the playlist, skipping songs, pausing songs, etc. The host 830 may also control the vehicle audio system 820's volume via the Cube 810. The Cube 810 receives the songs on the global playlist from the various participants 842, 844, and 846 and streams them to the vehicle audio system 820. As an example, the Cube 810 may receive songs on the playlist and stream them to the vehicle 820's audio system in real time, or may buffer a given number of songs at a time and then stream them to the vehicle audio system 820 in real time. The vehicle audio system 820 can play the songs and, if available, may announce which song it is about to play using its TTS system.

In this way, multiple devices can come together to form a single global device, where multiple playlists are joined into a single global playlist at the Cube 810. This global playlist is then addressable as a single entity, thereby providing a new representation of a disjoint set of devices (i.e., the host 830 and the participants 842, 844, and 846).

Figure 10:
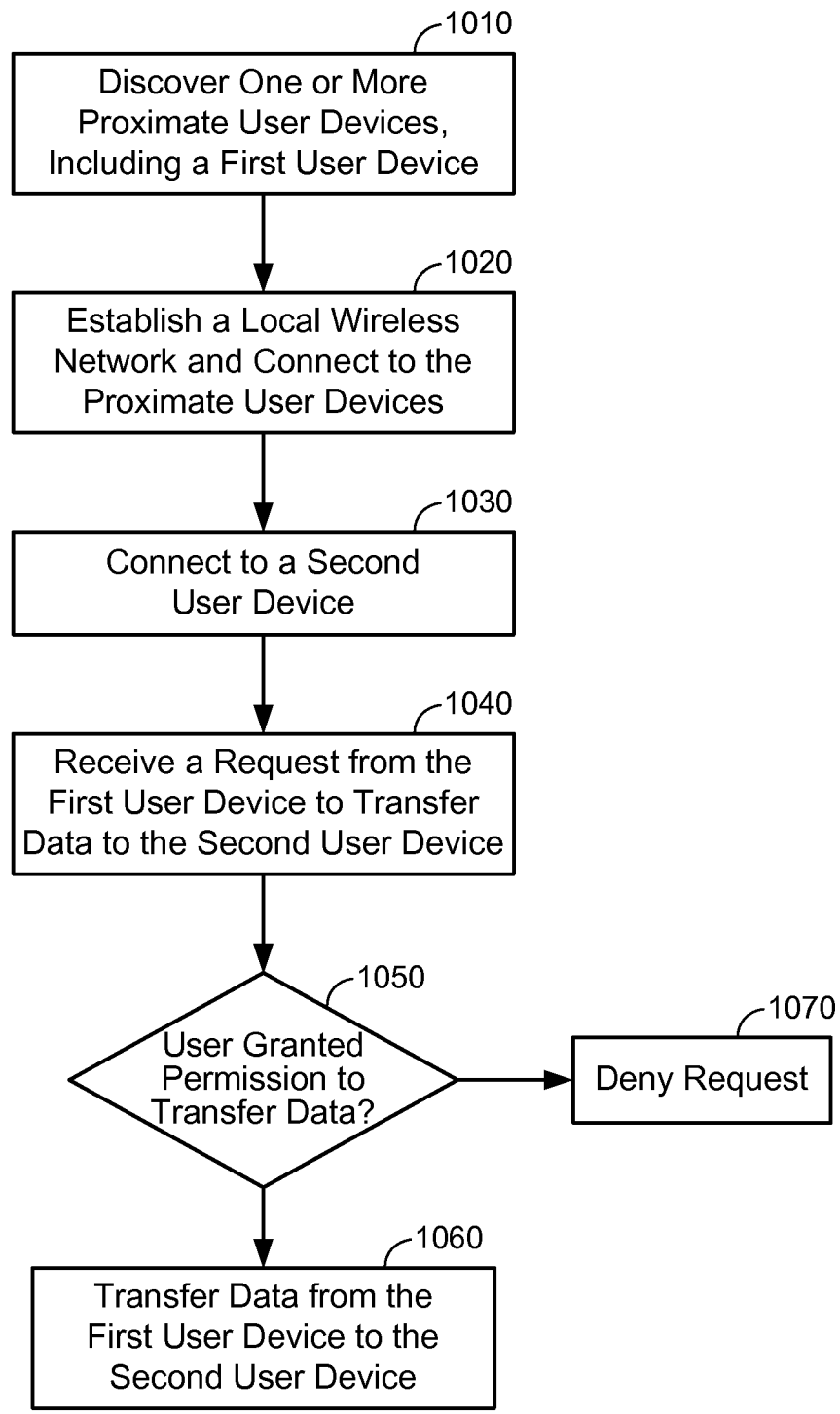
FIG. 10 illustrates an exemplary flow for providing interconnectivity between a plurality of user devices according to the various embodiments of the disclosure.

FIG. 10 illustrates an exemplary flow for providing interconnectivity between a plurality of user devices according to the various embodiments of the disclosure. The user devices may be IoT devices. A wireless interconnectivity device, such as the Cube 810 in FIGS. 8, 9A, and 9B may perform the flow illustrated in FIG. 10.

In the flow of FIG. 10, one or more user devices, including a first user device, may wish to access a second user device. However, the second user device may be such that only one user device can access it at a time. Alternatively, or additionally, the one or more user devices, including the first user device, and the second user device may be incompatible with each other. Accordingly, the wireless interconnectivity device can provide interconnectivity between these user devices. A user of a third user device can manage operations performed by the wireless interconnectivity device.

At 1010, the wireless interconnectivity device may discover the one or more user devices, including the first user device. The wireless interconnectivity device may discover the one or more user devices using an application to detect proximate devices. The one or more user devices, including the first user device, may discover the wireless interconnectivity device using a similar proximity detection application.

At 1020, the wireless interconnectivity device may establish a local wireless network and connect to the one or more user devices, including the first user device. The one or more user devices and the wireless interconnectivity device may connect to each other over the local wireless network using a P2P protocol. The one or more user devices may utilize a downloaded application to access the wireless interconnectivity device.

At 1030, the wireless interconnectivity device can connect to the second user device. The wireless interconnectivity device may connect to the second user device using a different local wireless network or a different type of local wireless network than the local wireless network established at 1020. For example, at 1020, the wireless interconnectivity device may establish a first WiFi network, while at 1030, the wireless interconnectivity device may connect to the second user device over a second WiFi network. As another example, at 1020, the wireless interconnectivity device may establish a WiFi or WiFi Direct network, while at 1030, the wireless interconnectivity device may connect to the second user device over a Bluetooth connection. The user of the third user device may instruct the wireless interconnectivity device to connect to the second user device.

Although FIG. 10 illustrates the wireless interconnectivity device discovering the one or more user devices (block 1010) and establishing the local wireless network and connecting to the one or more user devices (block 1020) before connecting to the second user device (block 1030), the wireless interconnectivity device may perform these operations in the reverse order, i.e., block 1030 followed by blocks 1010 and 1020, or substantially simultaneously.

At 1040, the wireless interconnectivity device may receive a request from the first user device to transfer data from the first user device to the second user device.

At 1050, the wireless interconnectivity device can determine whether or not the user, via the third user device, has granted permission to transfer the data from the first user device to the second user device. The third user device can grant permission to transfer data from the first user device to the wireless interconnectivity device by permitting the first user device to connect to the wireless interconnectivity device at 1020. Alternatively, the third user device may grant or deny permission to transfer data from the first user device to the wireless interconnectivity device based on each request to transfer data received by the wireless interconnectivity device from the first user device.

At 1060, if the third user device has granted permission, the wireless interconnectivity device may transfer the data from the first user device to the second user device. Otherwise, at 1070, if the third user device has not granted permission, the request is denied.

Although not illustrated in FIG. 10, the wireless interconnectivity device may receive a request from a fourth user device of the one or more user devices to transfer data from the fourth user device to the second user device. The wireless interconnectivity device may determine whether or not the third user device has granted permission to transfer the data from the fourth user device to the second user device. If the third user device has granted permission, the wireless interconnectivity device may transfer the data from the fourth user device to the second user device. The third user device may control the order that data is transferred from the first user device and the fourth user device to the second user device. The wireless interconnectivity device may create a global playlist that includes the data transferred from the first user device and the data transferred from the fourth user device. The global playlist may be addressable as a single entity and provide a representation of the first user device and the fourth user device.

Figure 11:
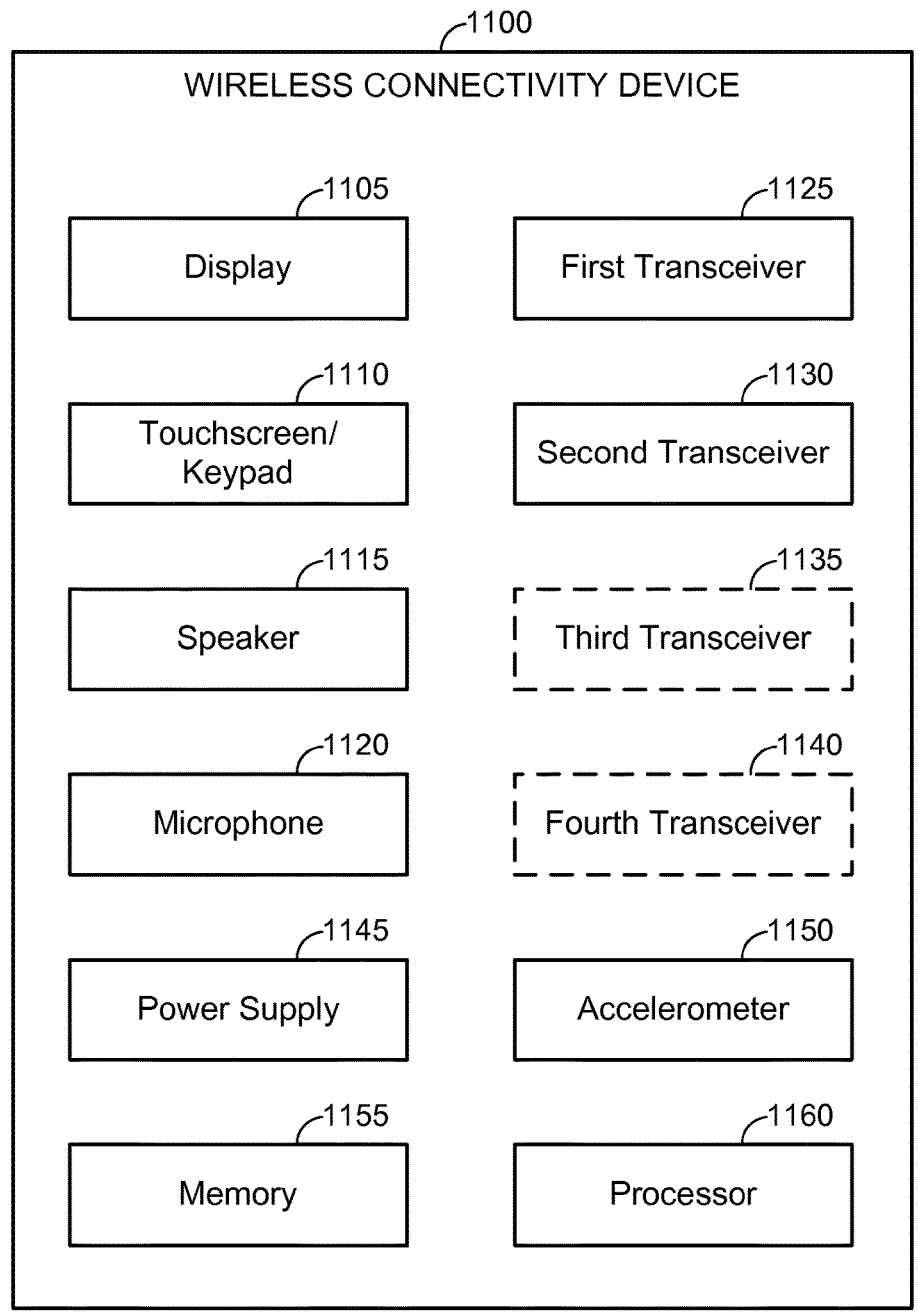
FIG. 11 illustrates an exemplary wireless interconnectivity device according to an aspect of the disclosure.

FIG. 11 illustrates an exemplary wireless interconnectivity device 1100, such as the Cube 810 in FIG. 8. The wireless interconnectivity device 1100 may include a display 1105, a touchscreen and/or keypad 1110, a speaker 1115, and a microphone 1120. The wireless interconnectivity device 1100 may also include two or more transceivers for discovering and communicating with other IoT devices. In the example of FIG. 11, the wireless interconnectivity device 1100 includes a first transceiver 1125 and a second transceiver 1130, and may optionally include any number of additional transceivers, such as a third transceiver 1135 and/or a fourth transceiver 1140. The transceivers 1125 to 1140 may be transceivers for, for example, local wireless networks, such as WiFi networks, WiFi Direct networks, LTE Direct networks, Bluetooth networks, etc. There should be at least one transceiver for one type of local wireless network and another transceiver for another type of network. In the example of FIG. 11, two of the transceivers 1125 to 1140 may be for one type of local wireless network and the other two transceivers 1125 to 1140 may be for another type of local wireless network. For example, transceivers 1125 and 1135 may be WiFi transceivers, while transceivers 1130 and 1140 may be Bluetooth transceivers.

The wireless interconnectivity device 1100 may also include a power supply 1145 and an accelerometer 1150. The power supply 1145 may be a wireless power supply, such as a WiPower™ wireless power supply. The wireless interconnectivity device 1100 may also include a memory 1155 and a processor 1160. The memory 1155 may be ROM, RAM, EEPROM, flash cards, or any memory common to computer platforms.

The display 1105, the touchscreen/keypad 1110, the speaker 1115, the microphone 1120, the transceivers 1125 to 1140, the memory 1155, and the processor 1160 may all be used cooperatively to load, store and execute the various functions disclosed herein, and thus the logic to perform these functions may be distributed over various elements. Alternatively, the functionality could be incorporated into one discrete component.

Accordingly, an aspect of the disclosure can include a wireless interconnectivity device (e.g., wireless interconnectivity device 1100) including the ability to perform the functions described herein. As will be appreciated by those skilled in the art, the various logic elements can be embodied in discrete elements, software modules executed on a processor (e.g., processor 1160) or any combination of software and hardware to achieve the functionality disclosed herein. For example, first and second transceivers 1125 and 1130, processor 1160, memory 1155, and/or touchscreen/keypad 1110 may all be used cooperatively to load, store and execute the various functions disclosed herein and thus the logic to perform these functions may be distributed over various elements. Alternatively, the functionality could be incorporated into one discrete component. Therefore, the features of the wireless interconnectivity device 1100 in FIG. 11 are to be considered merely illustrative and the disclosure is not limited to the illustrated features or arrangement.

For example, where the wireless interconnectivity device provides interconnectivity between a plurality of user devices, the first or second transceiver 1125 and 1130 may discover a first user device of the plurality of user devices. The other of the first or second transceivers 1125 and 1130 may discover a second user device of the plurality of user devices. One of the first or second transceivers 1125 and 1130, e.g., the first transceiver 1125, may connect to the first user device over a first local wireless network, such as a WiFi network. The other of the first or second transceivers 1125 and 1130, e.g., the second transceiver 1130, may connect to the second user device over a second local wireless network, such as a Bluetooth network. The processor 1160, via the first transceiver 1125, may receive a request from the first user device to transfer data from the first user device to the second user device. The processor 1160 may determine whether or not a third user device has granted permission to transfer the data from the first user device to the second user device. In an aspect, the third user device may be connected to the wireless interconnectivity device via the first local wireless network, and the processor 1160 may receive the permission from the third user device via the first transceiver 1125. The processor 1160, the memory 1155, and the first and second transceivers 1125 and 1130 may cooperatively transfer the data from the first user device to the second user device based on the third user device having granted permission to transfer the data from the first user device to the second user device.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of providing interconnectivity between a plurality of user devices performed by a wireless interconnectivity device, comprising:
    connecting to a first user device of the plurality of user devices over a first local wireless network;
    connecting to a second user device of the plurality of user devices over a second local wireless network;
    receiving a request from the first user device to transfer data from the first user device to the second user device;
    determining whether or not a third user device has granted permission to transfer the data from the first user device to the second user device; and
    transferring the data from the first user device to the second user device based on the third user device having granted permission to transfer the data from the first user device to the second user device.

2. The method of claim 1, wherein the first user device utilizes a downloaded application to access the wireless interconnectivity device.

3. The method of claim 1, wherein the first user device is unable to access the second user device without the wireless interconnectivity device providing interconnectivity.

4. The method of claim 1, wherein the third user device grants permission to transfer data from the first user device to the wireless interconnectivity device by permitting the first user device to connect to the wireless interconnectivity device.

5. The method of claim 1, wherein the third user device grants or denies permission to transfer data from the first user device to the wireless interconnectivity device based on each request to transfer data received by the wireless interconnectivity device from the first user device.

6. The method of claim 1, further comprising:
    receiving a request from a fourth user device of the plurality of user devices to transfer data from the fourth user device to the second user device;
    determining whether or not the third user device has granted permission to transfer the data from the fourth user device to the second user device; and
    transferring the data from the fourth user device to the second user device based on the third user device having granted permission.

7. The method of claim 6, further comprising:
    receiving input from the third user device controlling an order that the data is transferred from the first user device and the fourth user device to the second user device.

8. The method of claim 6, further comprising:
    creating a global playlist that includes the data transferred from the first user device and the data transferred from the fourth user device.

9. The method of claim 8, wherein the global playlist is addressable as a single entity and provides a representation of the first user device and the fourth user device.

10. The method of claim 1, further comprising:
    discovering the first user device; and
    discovering the second user device.

11. The method of claim 10, wherein the wireless interconnectivity device discovers the first user device using a proximity detection application.

12. The method of claim 1, further comprising:
    establishing, by the wireless interconnectivity device, the first local wireless network.

13. The method of claim 1, wherein the wireless interconnectivity device connects to the second user device based on a command from a user of the third user device.

14. The method of claim 1, wherein the first local wireless network comprises a same type of local wireless network as the second local wireless network.

15. The method of claim 1, wherein the first local wireless network comprises a different type of local wireless network as the second local wireless network.

16. A wireless interconnectivity device for providing interconnectivity between a plurality of user devices, comprising:
    a first transceiver configured to connect to a first user device of the plurality of user devices over a first local wireless network;
    a second transceiver configured to connect to a second user device of the plurality of user devices over a second local wireless network, wherein the first transceiver is further configured to receive a request from the first user device to transfer data from the first user device to the second user device; and
    a processor configured to determine whether or not a third user device has granted permission to transfer the data from the first user device to the second user device,
    wherein the second transceiver is further configured to transfer the data from the first user device to the second user device based on the third user device having granted permission to transfer the data from the first user device to the second user device.

17. The wireless interconnectivity device of claim 16, wherein the first user device is unable to access the second user device without the wireless interconnectivity device providing interconnectivity.

18. The wireless interconnectivity device of claim 16, wherein the third user device grants permission to transfer data from the first user device to the wireless interconnectivity device by permitting the first user device to connect to the wireless interconnectivity device.

19. The wireless interconnectivity device of claim 16, wherein the third user device grants or denies permission to transfer data from the first user device to the wireless interconnectivity device based on each request to transfer data received by the wireless interconnectivity device from the first user device.

20. The wireless interconnectivity device of claim 16, wherein the first transceiver is further configured to receive a request from a fourth user device of the plurality of user devices to transfer data from the fourth user device to the second user device, and
    wherein the processor is further configured to determine whether or not the third user device has granted permission to transfer the data from the fourth user device to the second user device, and
    wherein the second transceiver is further configured to transfer the data from the fourth user device to the second user device based on the third user device having granted permission.

21. The wireless interconnectivity device of claim 20, wherein the processor is further configured to receive input from the third user device controlling an order that the data is transferred from the first user device and the fourth user device to the second user device.

22. The wireless interconnectivity device of claim 20, wherein the processor is further configured to create a global playlist that includes the data transferred from the first user device and the data transferred from the fourth user device.

23. The wireless interconnectivity device of claim 22, wherein the global playlist is addressable as a single entity and provides a representation of the first user device and the fourth user device.

24. The wireless interconnectivity device of claim 16, wherein the first transceiver is further configured to discover the first user device based on a proximity detection application.

25. The wireless interconnectivity device of claim 16, wherein the first transceiver is further configured to establish the first local wireless network.

26. The wireless interconnectivity device of claim 16, wherein the second transceiver is further configured to connect to the second user device based on a command from a user of the third user device.

27. The wireless interconnectivity device of claim 16, wherein the first local wireless network comprises a same type of local wireless network as the second local wireless network.

28. The wireless interconnectivity device of claim 16, wherein the first local wireless network comprises a different type of local wireless network as the second local wireless network.

29. An apparatus for providing interconnectivity between a plurality of user devices, comprising:
    means for connecting to a first user device of the plurality of user devices over a first local wireless network;
    means for connecting to a second user device of the plurality of user devices over a second local wireless network;
    means for receiving a request from the first user device to transfer data from the first user device to the second user device;
    means for determining whether or not a third user device has granted permission to transfer the data from the first user device to the second user device; and
    means for transferring the data from the first user device to the second user device based on the third user device having granted permission to transfer the data from the first user device to the second user device.

30. A non-transitory computer-readable medium for providing interconnectivity between a plurality of user devices, comprising:
    at least one instruction to cause a wireless interconnectivity device to connect to a first user device of the plurality of user devices over a first local wireless network;
    at least one instruction to cause a wireless interconnectivity device to connect to a second user device of the plurality of user devices over a second local wireless network;
    at least one instruction to cause a wireless interconnectivity device to receive a request from the first user device to transfer data from the first user device to the second user device;
    at least one instruction to cause a wireless interconnectivity device to determine whether or not a third user device has granted permission to transfer the data from the first user device to the second user device; and
    at least one instruction to cause a wireless interconnectivity device to transfer the data from the first user device to the second user device based on the third user device having granted permission to transfer the data from the first user device to the second user device.

\* \* \* \* \*